C. J. SMITH.
Safety Stove.

No. 103,672. Patented May 31, 1870.

WITNESSES

INVENTOR
Charles J. Smith

2 Sheets—Sheet 2.
C. J. SMITH.
Safety Stove.
No. 103,672. Patented May 31, 1870.
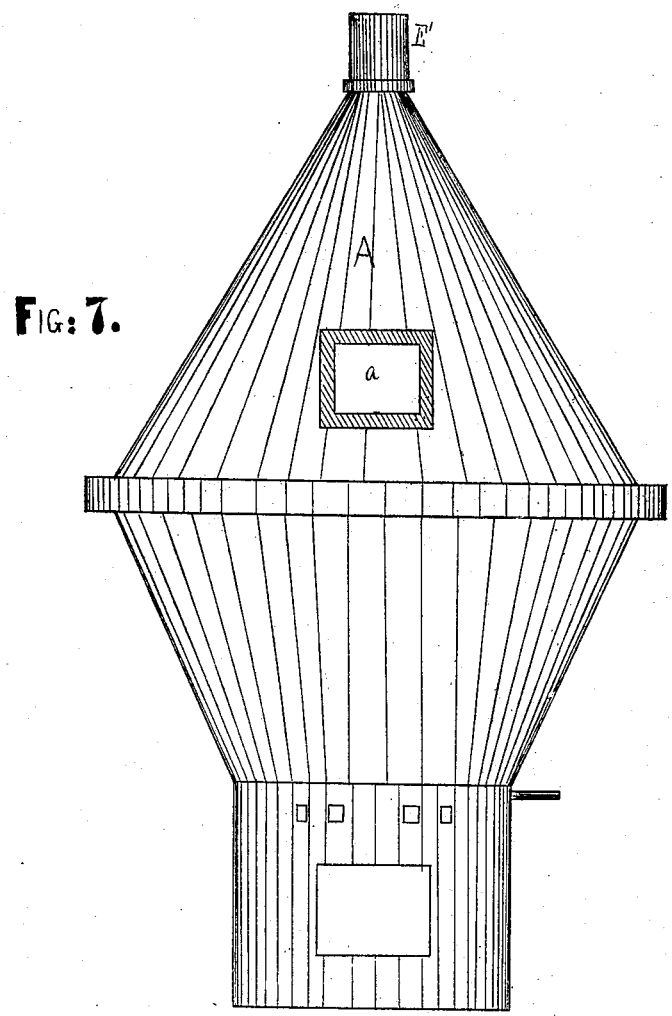
Fig: 7.
WITNESSES.
Edwin James.
Horace Brown
INVENTOR.
Charles J. Smith.
per J. E. F. Holmead
Attorney.

United States Patent Office.

CHARLES J. SMITH, OF NORFOLK, VIRGINIA.

Letters Patent No. 103,672, dated May 31, 1870.

SAFETY-STOVE.

The Schedule referred to in these Letters Patent and making part of the same.

*To all whom it may concern:*

Be it known that I, CHARLES J. SMITH, of Norfolk, in the county of Norfolk and State of Virginia, have invented certain new and useful Improvements in Safety-Stoves; and I do hereby declare that the following is a full, clear, and exact description of the same, reference being had to the accompanying drawing and to the letters of reference marked thereon making part of this specification, in which—

Figure 3 is a bottom view of the hollow cone, showing the metal guide-plate.

Figure 7 is a front view of a stove with my improvement attached.

This invention is an improvement on Letters Patent for safety-stoves granted me June 29, 1869, No. 92,115, and has for its object the construction of the combustion-chamber in such manner that the outside casing or cylinder can never attain a red heat, and should the stove by any means be overturned, the fire cannot escape, while, at the same time, sufficient draught is always afforded to ignite the fuel and keep the same in a state of combustion when desired.

The nature of my invention consists in securing within the combustion-chamber an inside casing of cast-iron or other suitable metal, so perforated and arranged that, while sufficient heat is allowed to fill the space between it and the outer casing of the stove, and through this means communicate heat to the outside, still the outer casing will be prevented from ever becoming red hot. This inner casing is so arranged that the same door that answers for the outer casing will answer for this, and is supported in its position by a hollow circular metallic disk or plate.

On top of this inner casing is placed a perforated wrought-iron plate, with a solid center, in which is securely fastened an upright rod.

Working freely up and down on this rod is a hollow cone, of suitable metal, provided with a curved projecting rim, and having a metallic guide-plate secured across the inside of the same and near its base.

In case the stove, of which this device is the combustion-chamber, is overturned, this cone falls to the top of the same, and its projecting rim, catching on a short interior pipe, which is fastened to the main pipe of the stove and extends a sufficient distance down into the same, effectually prevents the fire from escaping in that direction.

When the stove is in its natural position this cone rests on the solid center of the perforated plate.

To enable others skilled in the art to make and use my invention, I will now proceed to describe its construction and operation.

A is the outer casing, which is conical in form, and constructed of the usual metal, having an opening, $a$, for the purpose of replenishing the fuel when necessary.

Figure 2:
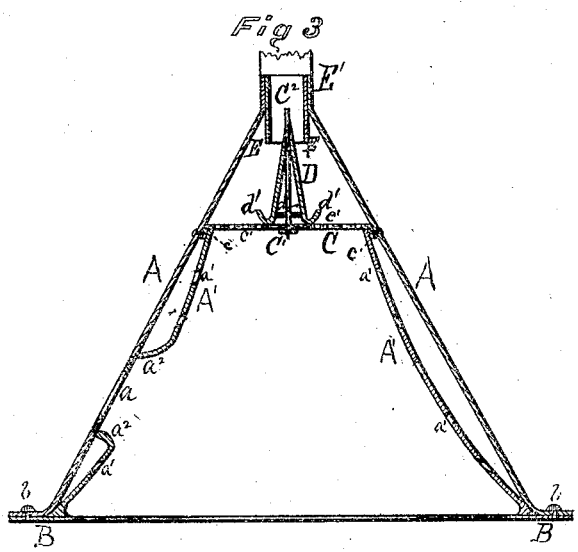
Figure 2 is a vertical sectional view of my device through the center of the same.
Figure 1:
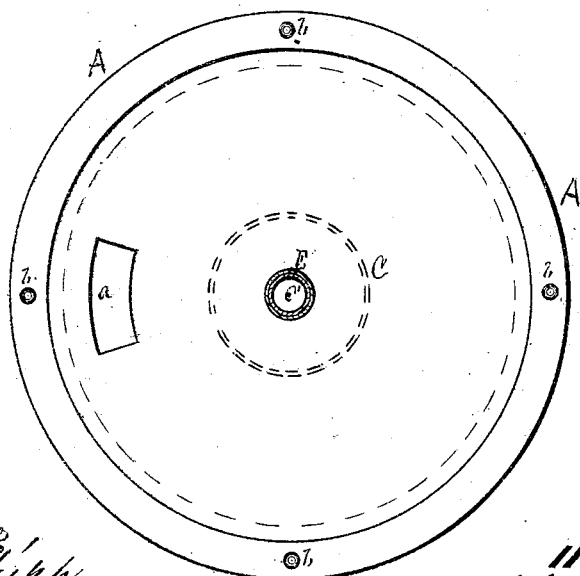
Figure 1 is a top view of the combustion-chamber, with my improvements.

A' is the inner casing, which is constructed of cast-iron, and has a circular sweep, as clearly shown in fig. 2.

This inner casing A' has numerous perforations $a^1$ $a^1$, and is provided with an opening corresponding with the opening $a$ of the outer casing A.

The sides $a^2$ $a^2$ of this opening are so extended as to reach the opening $a$ when the inner case is in position, so that the same door which answers for one casing will answer for both.

To the bottom of the casing A is fastened, by bolts and nuts $b$ $b$, a hollow circular disk, B, of wrought metal, which extends sufficiently far into the interior of the chamber to afford a support for the inner casing A'.

C is a circular wrought-metal plate, which rests on the top of the inner casing A', being flanged at $c$ $c$, and secured in the usual manner.

This plate C has, also, numerous perforations $c'$ $c'$, and is provided with a solid center, $C^1$, to which is secured an upright rod, $C^2$.

On this rod $C^2$ is placed a hollow cone, D, of wrought metal, having a metal guide-plate, $d$, extending across the interior of the same, near its base.

This cone D is so constructed that it moves freely up and down on the rod $C^2$, and is provided with a projecting rim, $d'$ $d'$, slightly curved.

Figure 5:
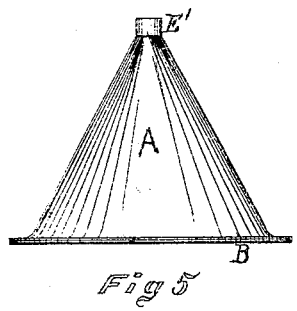
Figure 5 is a side view of my device.
Figure 4:
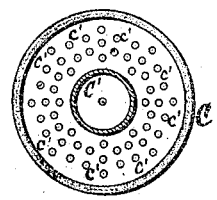
Figure 4 is a top view of the perforated wrought-iron plate and hollow cone.
Figure 6:
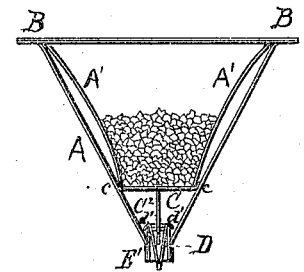
Figure 6 is a vertical sectional view of my device through the center, the stove being represented as overturned.

E is an interior pipe, securely fastened to the main pipe E', and extending so far below the apex of the cone A, that, when the stove is overturned, the projecting rim $d'$ $d'$ of the cone D shall catch over the same, and prevent the fire from escaping therefrom, as clearly shown in fig. 6.

Having thus fully described my invention,

What I claim therein as new, and desire to secure by Letters Patent of the United States, is—

The outer casing A, inner casing A', with its perforations $a^1$ $a^1$, circular disk B, perforated plate C, with its solid center $C^1$ and upright rod $C^2$, hollow cone D, with its curved projecting rim $d'$ and interior pipe E, when the whole is so combined and arranged as to form a combustion-chamber for a safety-stove, substantially as described.

In testimony whereof I have signed my name to this specification in the presence of two subscribing witnesses.

C. J. SMITH.

Witnesses:
R. G. STAPLES,
W. W. PEED.